US010597950B2

(12) United States Patent
McGowan et al.

(10) Patent No.: US 10,597,950 B2
(45) Date of Patent: *Mar. 24, 2020

(54) PRE-INSTALLED ANTI-ROTATION KEY FOR THREADED CONNECTORS

(71) Applicant: Vetco Gray Inc., Houston, TX (US)

(72) Inventors: Daniel Paul McGowan, Houston, TX (US); Joseph William Pallini, Jr., Tomball, TX (US); Dennis Robert Martinchich, Houston, TX (US); Andrew Andor Zac-Williams, Houston, TX (US); William Alexander Loose-Mitchell, Houston, TX (US)

(73) Assignee: VETCO GRAY, LLC, Houston, TX (US)

( * ) Notice: Subject to any disclaimer, the term of this patent is extended or adjusted under 35 U.S.C. 154(b) by 913 days.

This patent is subject to a terminal disclaimer.

(21) Appl. No.: 14/877,073

(22) Filed: Oct. 7, 2015

(65) Prior Publication Data

US 2017/0101828 A1    Apr. 13, 2017

(51) Int. Cl.
| | |
|---|---|
| *F16L 15/06* | (2006.01) |
| *E21B 17/043* | (2006.01) |
| *E21B 17/08* | (2006.01) |
| *F16L 15/08* | (2006.01) |

(52) U.S. Cl.
CPC ............ *E21B 17/043* (2013.01); *E21B 17/08* (2013.01); *F16L 15/06* (2013.01); *F16L 15/08* (2013.01)

(58) Field of Classification Search
CPC ........ E21B 17/043; E21B 17/08; F16L 15/08; F16L 15/06; Y10T 29/49883
See application file for complete search history.

(56) References Cited

U.S. PATENT DOCUMENTS

| | | | |
|---|---|---|---|
| 4,363,359 A | 12/1982 | Taylor et al. | |
| 5,290,126 A | 3/1994 | Gariepy et al. | |
| 6,695,059 B2 | 2/2004 | Thomas et al. | |
| 8,474,876 B2 | 7/2013 | Watterson, II et al. | |
| 10,077,858 B2 * | 9/2018 | Pallini, Jr. | ............... F16L 15/06 |
| 2012/0267456 A1 * | 10/2012 | Imagawa | ............... F16L 19/005 |
| | | | 239/569 |
| 2014/0103640 A1 * | 4/2014 | O'Dell | .................. E21B 17/046 |
| | | | 285/91 |
| 2014/0103645 A1 | 4/2014 | Steen et al. | |
| 2014/0167408 A1 | 6/2014 | Steen et al. | |

* cited by examiner

*Primary Examiner* — Sarang Afzali
*Assistant Examiner* — Ruth G Hidalgo-Hernandez
(74) *Attorney, Agent, or Firm* — Hogan Lovells US LLP

(57) ABSTRACT

A tubular member connection system includes a pin having a central axis, external pin threads, and an annular pin lip at a shoulder surface. A box has internal box threads and an annular box lip at an end surface of the box. The box threads are shaped to mate with the pin threads to releasably secure the pin to the box. A recess is formed in an outer diameter surface of the pin and extends in an axial direction from the pin lip. An anti-rotation key is located within the recess and has a row of teeth along an outer edge. A fastener retains the anti-rotation key in the recess. A circumferentially extending series of grooves on the box lip are sized to engage the teeth and resist a rotation of the pin relative to the box in an unscrewing direction when the pin is releasably secured to the box.

13 Claims, 2 Drawing Sheets

PRE-INSTALLED ANTI-ROTATION KEY FOR THREADED CONNECTORS

BACKGROUND

1. Field of the Disclosure

This invention relates in general to threaded tubular connections, such as for large diameter pipes used in offshore hydrocarbon drilling and production operations, and particularly to a device to prevent rotation of tubular members after they are made up.

2. Background of the Disclosure

Hydrocarbon production wells can have several strings of casing of differing diameters cemented in the well. Each casing string can be made up of joints of pipe having threaded ends that are secured together. Some casing joints have external threads on their upper and lower ends. A casing collar with internal threads secures the threaded ends together. In larger casing diameters, a casing collar with internal threads may be affixed, such as by welding, to one end of each tubular member, the other end having external threads. The portion of the connector having internal threads is commonly known as a female connector or box. The portion of the connector having external threads is commonly known as a male connector or pin. Normally, the operator relies on the friction of the made-up joint to prevent the threaded connectors from loosening while running the string into the well. With larger diameter casing, for example, from 16 inch to 36 inch, the friction of the made-up connector may be inadequate to prevent loosening while running the casing.

Operators have employed anti-rotation keys to prevent loosening. Some current anti-rotation key designs require specialty tools to install the locking mechanism. Some designs require explosive powered guns to set the locking mechanism. Other designs can be difficult to unlock in the event it is necessary to unscrew the pipe connection. Other current anti-rotation key designs require drilling a hole for the locking member after the pipe connection is made up. Drilling can result in metal shavings falling down the pipe string, which can cause issues. Further, drilling a made up pipe connection requires a complex drill. If disconnected, then reconnected, it may be necessary to drill another hole, and that hole may overlap the previously drilled hole, limiting the locking capacity.

In other current casing setups, the anti-rotation key can insert through a hole in the box and a hammer or wrench may be employed to position and secure the key. The anti-rotation key of such systems can have teeth that bite into the connector members, either upon insertion or when the pin starts to rotate out of the box, applying an axial compressive load on the connector members and permanently deforming the connector members in order to prevent relative rotation between the box and the pin.

SUMMARY OF THE DISCLOSURE

Systems and methods disclosed herein provide an anti-rotation device for threaded connections having a pre-installed anti-rotation key. The anti-rotation key can be installed by the manufacturer with no adjustments required in the field. A recess in one of the pins or boxes allows the anti-rotation key to ratchet along grooves of the other of the pin or box as the connection is rotated in a make-up direction. A biasing member urges the anti-rotation key into the grooves to provide resistance when rotating the connection in an unscrewing direction. Embodiments disclosed herein eliminate the need for installation tools on site and for extended rig time because the anti-rotation key is pre-installed.

Systems and methods disclosed herein provide an anti-rotation key that produces significantly less axial load than some current anti-rotation devices. Due to not knowing where the shoulders of the pin and box would end up circumferentially relative to one another after make-up, some previous anti-rotation keys were designed to bite into the end of the box during installation and operational loading. The residual axial force left by these keys is quite high. Installing a key that must bite into the box also takes up valuable rig time and requires complex tools. Embodiments of the anti-rotation key disclosed herein, instead transfers load in predominantly the circumferential direction. Systems and methods disclosed herein provide an anti-rotation key that is installed into a clocked recess, that ensures that the anti-rotation key is properly aligned with the grooves when the pin and box are made-up, negating the need for time consuming installation on the rig.

In accordance with an embodiment of this disclosure, a tubular member connection system includes a pin having a central axis, external pin threads, and an annular pin lip at a shoulder surface of the pin. A box has internal box threads and an annular box lip at an end surface of the box. The box threads are shaped to mate with the pin threads to releasably secure the pin to the box. A recess is formed in an outer diameter surface of the pin, the recess extending in an axial direction from the pin lip. An anti-rotation key is located within the recess and carried by the pin, the anti-rotation key having a row of teeth along an outer edge of the anti-rotation key. A fastener retains the anti-rotation key in the recess. A circumferentially extending series of grooves can be located on the box lip of the box, the grooves sized to engage the teeth of the anti-rotation key and to resist a rotation of the pin relative to the box in an unscrewing direction when the pin is releasably secured to the box.

In an alternate embodiment of this disclosure, a tubular member connection system includes a pin having a central axis, external pin threads, and an annular pin lip at a pin shoulder of the pin. A first tubular member extends from the pin in a direction opposite the pin lip of the pin. The tubular member connection system also includes a box having internal box threads, and an annular box lip at an end surface of the box. The box threads are mated with the pin threads, releasably securing the pin to the box. A second tubular member extends from the box in a direction opposite the end surface of the box. A recess is formed in an outer diameter surface of one of the pin and the box, the recess extending in an axial direction from the end surface. An anti-rotation key is located within the recess, the anti-rotation key having a row of teeth along an outer edge of the anti-rotation key. A fastener retains the anti-rotation key in the recess. A circumferentially extending series of grooves is located on the other of the pin and the box and are engaged by the teeth, resisting a rotation of the pin relative to the box in an unscrewing direction.

In yet another alternate embodiment, a method for connecting tubular members includes providing a pin having a central axis, external pin threads, and an annular pin lip at a pin shoulder of the pin. A recess is formed in an outer diameter surface of the pin, the recess extending in an axial direction from the pin lip. An anti-rotation key is located within the recess and the anti-rotation key is retained in the recess with a fastener so that the anti-rotation key is carried by the pin. The anti-rotation key has a row of teeth along an outer edge of the anti-rotation key. A box is provided that has internal box threads and an annular box lip at an end surface of the box, the box having a circumferentially extending series of grooves on the box lip of the box. The box threads are mated with the pin threads to releasably secure the pin to the box so that the grooves of the box engage the teeth of the anti-rotation key and resist a rotation of the pin relative to the box in an unscrewing direction.

BRIEF DESCRIPTION OF THE DRAWINGS

So that the manner in which the features, advantages and objects of the disclosure, as well as others which will become apparent, are attained and can be understood in more detail, more particular description of the embodiments briefly summarized above may be had by reference to the embodiment thereof which is illustrated in the appended drawings, which drawings form a part of this specification. It is to be noted, however, that the drawings illustrate only an example embodiment of the disclosure and are therefore not to be considered limiting of its scope as the disclosure may admit to other equally effective embodiments.

DETAILED DESCRIPTION

Figure 1:
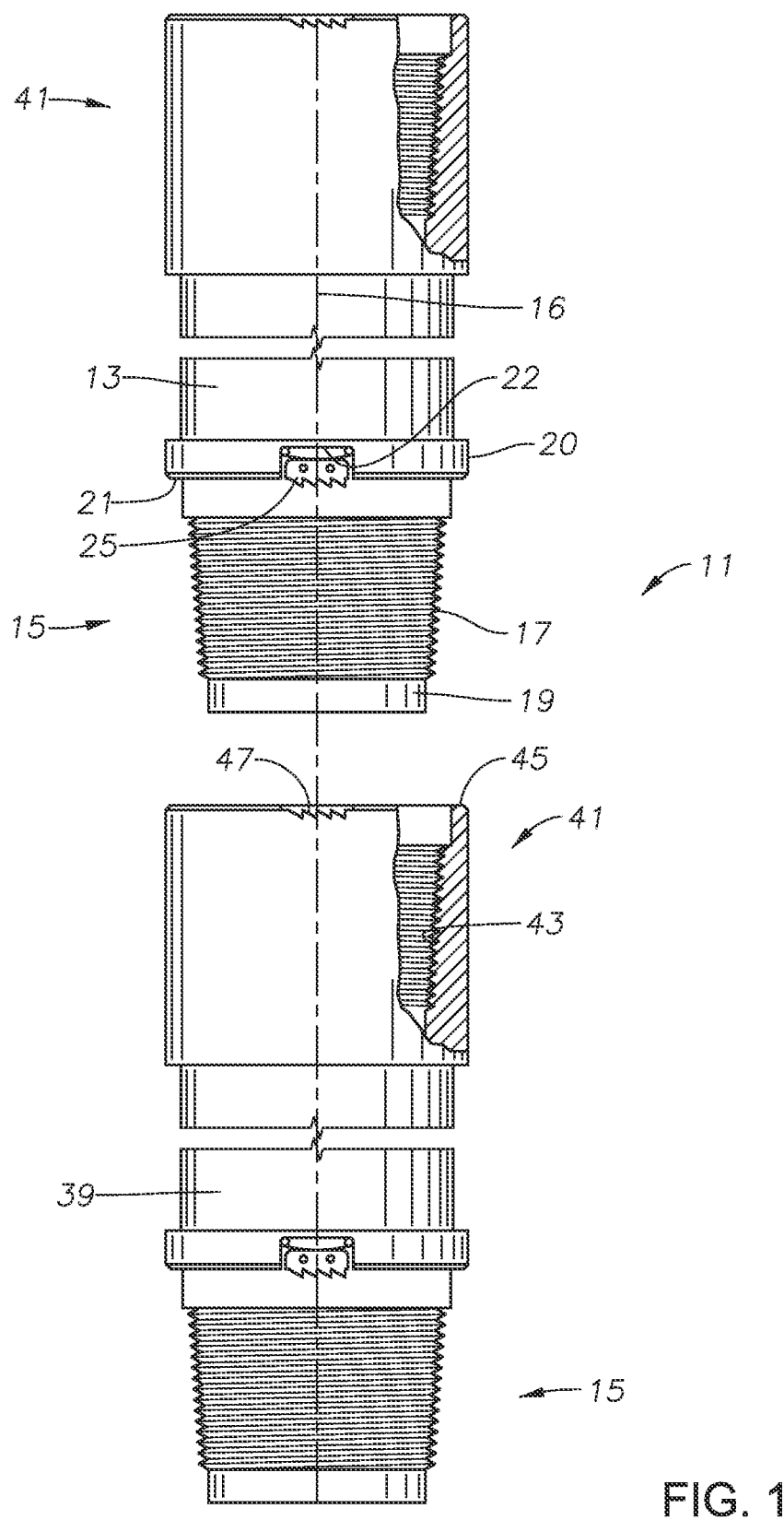
FIG. 1 is a side elevation view of a tubular string having a tubular member connector system in accordance with an embodiment of this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, tubular member connection system 11 includes a first or upper tubular member 13 with pin 15 formed on an end of upper tubular member 13. The terms "upper" and "lower" are used only for convenience as pin 15 could be located on the upper end of tubular member 13, if the tubular member is inverted. Pin 15 has a longitudinal central axis 16 and a set of external pin threads 17 located on a conical surface. Pin 15 has a nose 19 on a pin end that is on an outer side of pin threads 17 and an external annular pin shoulder 20 at an opposite side of pin threads 17. Pin lip 21 is an annular surface of pin shoulder 20 that faces towards nose 19. Upper tubular member 13 extends from pin 15 in a direction opposite nose 19 of pin 15.

Recess 22 is formed in an outer diameter surface of pin 15. In the example of FIG. 1, recess 22 is formed in pin shoulder 20. Recess 22 is open at pin lip 21 and extends axially in a direction away from nose 19. Recess 22 has a depth that is less than the thickness of the sidewall of pin 15 so that recess 22 has a back surface 23 (FIG. 2).

Figure 2:
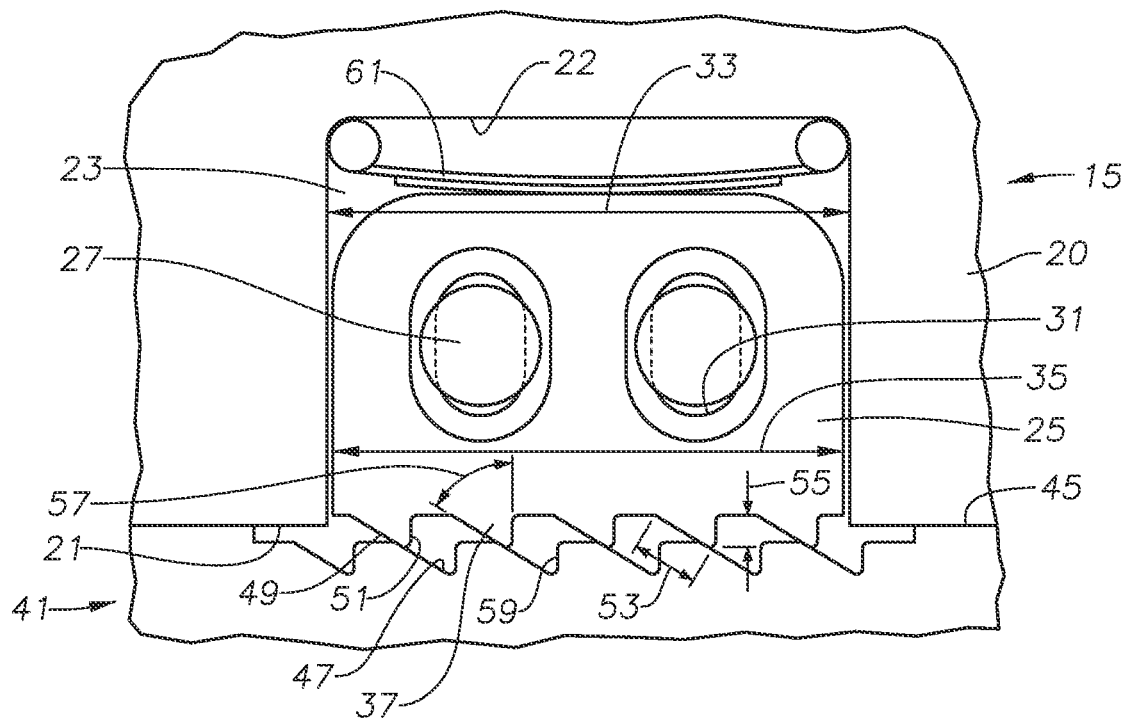
FIG. 2 is a perspective detail view of a tubular member connector system in accordance with an embodiment of this disclosure, shown in a ratcheting position.

Looking at FIG. 2, anti-rotation key 25 is located within recess 22. Anti-rotation key 25 is retained with, and carried by, pin 15. Fasteners 27 can be used to retain anti-rotation key 25. Anti-rotation key 25 has opening 31 through a depth of anti-rotation key 25 so that fastener 27 can extend through opening 31 and into pin 15 to retain anti-rotation key 25 with pin 15. Fastener 27 can be, for example, a threaded member such as a shoulder screw or bolt that can pass through opening 31 and be threaded into pin 15. Fasteners 27 are omitted from FIG. 3 for clarity in order to visualize the holes in pin 15 into which fasteners 27 extend.

As can be seen in FIG. 2, opening 31 can have a larger internal dimension than an outer dimension of the shank of fastener 27, but less than the outer dimension of the head of fastener 27, so that anti-rotation key 25 can move relative to pin 15, while still being retained with, and carried by, pin 15. Recess 22 can have a larger width 33 than a width 35 of anti-rotation key 25 so that anti-rotation key 25 can move from side to side within recess 22. However, the internal dimension of opening 31 should not be so large compared to the excess width of recess 22 such that fastener 27 is subjected to shearing forces during any relative rotational movement between pin 15 and box 41. Instead the loads will be transferred between grooves 47, teeth 37, and an inside wall of recess 22 as is further described herein. Back surface 23 of recess 22 can be a planar surface and the front and back faces of anti-rotation key 25 can also be planar. In alternate embodiments, back surface 23 of recess 22 and the front and back faces of anti-rotation key 25 can be curved surfaces and can, as an example, have a similar curvature as the sidewall of pin 15.

Anti-rotation key 25 has a row of teeth 37 along an outer edge of anti-rotation key 25. Anti-rotation key 25 extends from and out of recess 22 so that teeth 37 extend axially past pin lip 21.

Looking again at FIG. 1, tubular member connection system 11 also includes a second or lower tubular member 39 with box 41 formed on an end of lower tubular member 39. Box 41 has internal box threads 43 shaped to mate with pin threads 17 to releasably secure pin 15 to box 41. Box 41 has annular box lip 45 at an end surface of box 41. Lower tubular member 39 extends from box 41 in a direction opposite the end surface of box 41. Upper tubular member 13 can have a second box 41 at an opposite end of upper tubular member 13 from pin 15 and lower tubular member 39 can have a second pin 15 at an opposite end of lower tubular member from box 41. A pin 15 of a next tubular member can be releasably secured to box 41 of upper tubular member 13 to form a tubular string. Similarly, a box 41 of a prior tubular member can be releasably secured to pin 15 of lower tubular member 39.

A circumferentially extending series of grooves 47 can be located on box lip 45 of box 41. Grooves 47 can be machined in box lip 45 of box 41. Grooves 47 are sized to engage teeth 37 of anti-rotation key 25, and to resist a rotation of pin 15 relative to box 41 in an unscrewing direction when pin 15 is releasably secured to box 41. Grooves 47 are also sized to engage teeth 37 of anti-rotation key 25 in a way that allows a rotation of pin 15 relative to box 41 in a make-up direction. The make-up direction is the direction of the relative rotation between pin 15 and box 41 that causes pin 15 to thread into box 41 to releasably secure pin 15 within box 41. The unscrewing direction is the direction of the relative rotation between pin 15 and box 41 that is opposite the make-up direction. Relative rotation in the unscrewing direction causes pin 15 to thread out of box 41 to allow pin 15 to be released and separated from box 41.

Figure 3:
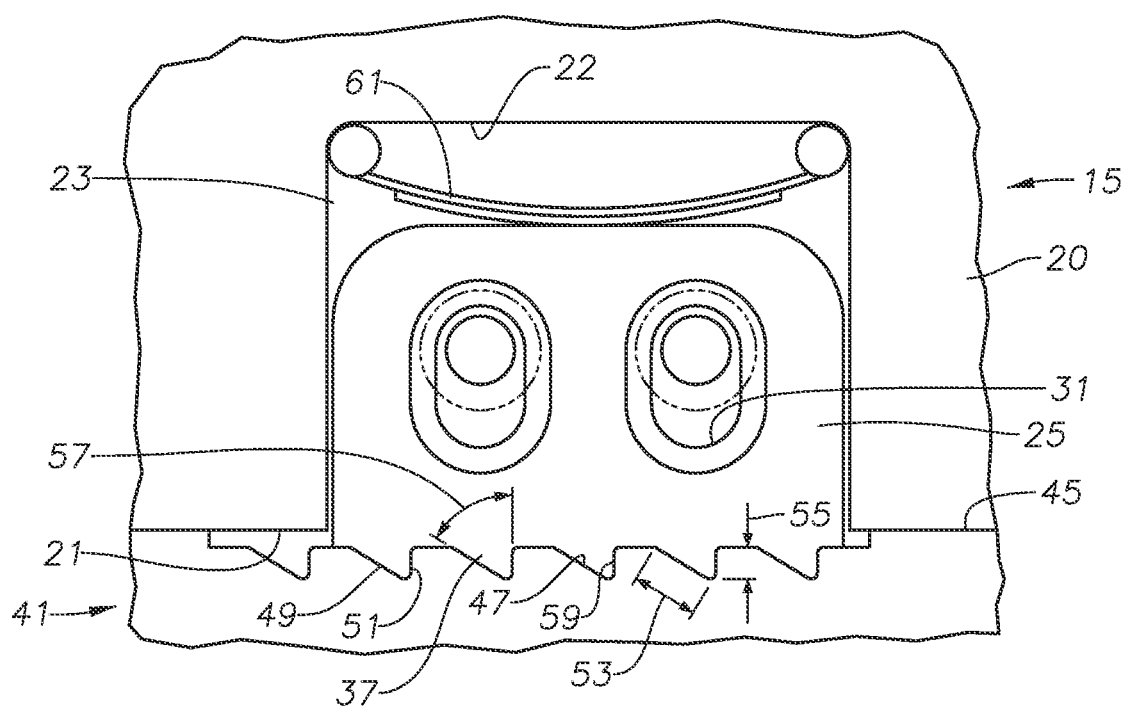
FIG. 3 is a perspective detail view of the tubular member connector system of claim 2, shown in a fully engaged position.

Looking at FIG. 2, in order to allow such an engagement of teeth 37 with grooves 47, each of the teeth 37 has a leading flank 49 and a trailing flank 51 relative to the make-up rotation of pin 15 and box 41. Leading flank 49 has a longer leading face 53 than a length of trailing face 55 of trailing flank 51. Leading flank 49 is at a greater angle 57 relative to a line parallel to central axis 16 than a lesser angle of trailing flank 51 relative to the line parallel to central axis 16. In the example of FIGS. 2-3, the lesser angle of trailing flank 51 is equal to zero since trailing flank 51 is parallel to central axis 16. In alternate embodiments, the lesser angle of trailing flank 51 relative to the line parallel to central axis 16 can be a value greater than zero and can have an angle in the same direction as greater angle 57 so that trailing flank 51 is undercut and has a trailing face directed towards anti-rotation key 25. In yet other alternate embodiments, the lesser angle of trailing flank 51 relative to the line parallel to central axis 16 can be a value greater than zero and can have an angle in the opposite direction as greater angle 57 so that trailing flank 51 has a trailing face directed away from anti-rotation key 25 so long as grooves 47 can still engage teeth 37 to resist a rotation of pin 15 relative to box 41 in an unscrewing direction.

When pin 15 is rotated in a make-up direction relative to box 41, leading flank 49 of teeth 37 will ratchet along grooves 47 (FIG. 2). When teeth 37 are ratcheting along grooves 47, anti-rotation key 25 will move within recess 22 to allow for the ratcheting motion. When pin 15 is releasably secured to box 41 and pin lip 21 is proximate to or engaged with box lip 45, trailing flank 51 can engage engaging face 59 of groove 47 to resist a rotation of pin 15 relative to box 41 in the unscrewing direction (FIG. 3).

In the example of FIGS. 2-3, pin threads 17 and box threads 43 are shown as traditional right-handed thread forms so that rotating pin 15 in a clockwise direction relative to box 41 is the make-up direction of rotation. Rotating pin 15 counter-clockwise relative to box 41 is the unscrewing direction of rotation. In alternate embodiments, pin threads 17 and box threads 43 can be left-handed thread forms so that that rotating pin 15 in a counter-clockwise direction relative to box 41 is the make-up direction of rotation and rotating pin 15 clockwise relative to box 41 is the unscrewing direction of rotation.

Tubular member connection system 11 further includes biasing member 61. Biasing member 61 urges anti-rotation key 25 in a direction towards pin threads 17 so that when pin 15 is releasably secured to box 41, biasing member 61 urges teeth 37 of anti-rotation key 25 into engagement with grooves 47. Biasing member 61 is shown in the example of FIGS. 2-3 as being a leaf spring. However, biasing member 61 can be any other type of spring or other biasing type device that can be used to urge anti-rotation key 25 into engagement with grooves 47.

In order to ensure that anti-rotation key 25 will align with grooves 47 when pin 15 is releasably secured to box 41 in a fully made-up position, the location of recess 22 can be pre-determined by clocking the final made-up position of grooves 47 relative to pin 15 prior to forming recess 22 in pin 15. This clocking procedure can be completed by making up pin 15 with a dummy box that has an identical configuration of box threads 43 and relative location of grooves 47 as actual box 41. Due to this clocking procedure to determine the position of recess 22 on pin 15, each of the teeth 37 will engage one of the grooves 47 when pin 15 is threaded to box 41 in a make-up rotation direction until pin lip 21 engages box lip 45.

In addition, in order to ensure that anti-rotation key 25 will align with grooves 47 when pin 15 is releasably secured to box 41 in a fully made-up position, there can be a greater number of grooves 47 than teeth 37. In this way, when pin 15 is releasably secured to box 41 and each of the teeth 37 engages one of the grooves 47, there are options as to which grooves 47 are engaged by teeth 37. For example, looking at the embodiment of FIG. 3, the first groove 47 is not engaged by one of the teeth 37. In alternate examples, the first groove 47 might be engaged by a tooth 37 and one or more last grooves 47 may not be engaged by a tooth 37, depending on the final location of teeth 37 relative to grooves 47 when pin 15 is fully made-up with box 41.

Note that although recess 22 has been described herein as being formed on pin 15 and grooves 47 are described herein as being formed in box 41, in alternate embodiments, recess 22 can be formed in box 41 and grooves 47 can be formed in pin 15.

In an example of operation, box 41 can be provided on lower tubular member 39, and grooves 47 can be formed in box lip 45, such as by machining grooves 47 in box lip 45. Pin 15 can be provided on upper tubular member 13. Recess 22 can be formed in an outer diameter surface of pin 15, such as by machining recess 22 in pin 15. The location of recess 22 can be clocked so that recess 22 will align with grooves 47 when pin 15 and box 41 are fully made-up.

Anti-rotation key 25 can then be located within recess 22 and retained within recess 22 with one or more fasteners 27. Nose 19 of pin 15 can then be located within box 41 and pin 15 can be rotated so that box threads 43 can mate with pin threads 17. Pin 15 can be threaded to box 41 in a make-up rotation direction until pin lip 21 engages box lip 45 and tubular member connection system 11 is in a fully made-up position. This will releasably secure pin 15 to box 41 so that grooves 47 of box 41 engage teeth 37 of anti-rotation key 25. When rotating to the made-up position, teeth 37 will ratchet along grooves 47 (FIG. 2). When tubular member connection system 11 is in a fully made-up position, each of the teeth 37 can engage the grooves 47 to resist a rotation of pin 15 relative to box 41 in an unscrewing direction (FIG. 3). If there is a relative rotational force applied in and unscrewing direction, the rotational force will pass from box 41 though grooves 47 to teeth 37 of anti-rotation key 25. A side of anti-rotation key 25 will abut the inside wall of recess 22 to transfer such load from anti-rotation key 25 to pin 15 without applying a shearing force to fasteners 27. Biasing member 61 will urge anti-rotation key 25 in a direction towards grooves 47 so that teeth 37 remain engaged with grooves 47.

Normally, tubular member connection system 11 is not unscrewed once made up. On some occasions, however, the operator might wish to unscrew tubular member connection system 11. In such a case, an operator can manually slide anti-rotation key 25 axially or remove fasteners 27 and anti-rotation key 25 completely so that teeth 37 are no longer engaged with grooves 47. Pin 15 can then be rotated relative to box 41 in an unscrewing direction to release pin 15 from box 41 so that upper tubular member 13 can be separated from lower tubular member 39.

Embodiments of tubular member connection system 11 disclosed herein therefore provide an anti-rotation key that can be installed by the manufacturer with no adjustments required in the field, eliminating the need for both installation tools on site and for extended rig time.

Systems and method disclosed here are therefore well adapted to carry out the objects and attain the ends and advantages mentioned, as well as others inherent therein. While an example embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of this disclosure and the scope of the appended claims. The terms "vertical", "horizontal", "upward", "downward", "top", and "bottom" are used herein only for convenience because the tubular members may be installed in various positions.

What is claimed is:

1. A tubular member connection system, comprising:
   a pin having a central axis, external pin threads, and an annular pin lip at a shoulder surface of the pin;
   a box having internal box threads and an annular box lip at an end surface of the box, the box threads shaped to mate with the pin threads to releasably secure the pin to the box;
   a recess formed in an outer diameter surface of the pin, the recess extending in an axial direction from the pin lip;
   an anti-rotation key located within the recess and carried by the pin, the anti-rotation key having a row of teeth along an outer edge of the anti-rotation key;
   a fastener retaining the anti-rotation key in the recess; and
   a circumferentially extending series of grooves on the box lip of the box, the grooves sized to engage the teeth of the anti-rotation key and to resist a rotation of the pin relative to the box in an unscrewing direction when the pin is releasably secured to the box;
   wherein the anti-rotation key has an opening through a depth of the anti-rotation key, and wherein the fastener extends through the opening and into the pin, the opening having a larger internal dimension than an outer dimension of the fastener so that the anti-rotation key can move relative to the pin.

2. The system according to claim 1, further comprising a biasing member urging the anti-rotation key in a direction towards the pin threads of the pin.

3. The system according to claim 1, wherein the grooves are sized to engage the teeth of the anti-rotation key and to allow a rotation of the pin relative to the box in a make-up direction.

4. The system according to claim 1, wherein each of the teeth of the anti-rotation key has a leading flank and a trailing flank relative to a make-up rotation of the pin and the box, the leading flank having a longer leading face than a trailing face of the trailing flank.

5. The system according to claim 1, wherein:
   each of the teeth has a leading flank and a trailing flank relative to a make-up rotation of the pin being threaded into the box; and
   the leading flank is at a greater angle relative to a line parallel to the central axis than the trailing flank.

6. The system according to claim 1, wherein the number of grooves is greater than the number of teeth and wherein, when the pin is releasably secured to the box, each of the teeth engages one of the grooves.

7. The system according to claim 1, wherein the recess is located on the pin in a position such that each of the teeth engages one of the grooves when the pin is threaded to the box in a make-up rotation direction until the pin lip engages the box lip.

8. The system according to claim 1, wherein the anti-rotation key extends from the recess so that the teeth are axially past the pin lip.

9. A tubular member connection system, comprising:
   a pin having a central axis, external pin threads, and an annular pin lip at a pin shoulder of the pin;
   a first tubular member extending from the pin in a direction opposite the pin lip of the pin;
   a box having internal box threads and an annular box lip at an end surface of the box, the box threads mated with the pin threads, releasably securing the pin to the box;
   a second tubular member extending from the box in a direction opposite the end surface of the box;
   a recess formed in an outer diameter surface of one of the pin and the box;
   an anti-rotation key located within the recess, the anti-rotation key having a row of teeth along an outer edge of the anti-rotation key;
   a fastener retaining the anti-rotation key in the recess; and
   a circumferentially extending series of grooves on the other of the pin and the box that are engaged by the teeth, resisting a rotation of the pin relative to the box in an unscrewing direction;
   wherein the anti-rotation key has an opening through a depth of the anti-rotation key, and wherein the fastener extends through the opening and into the pin, the opening having a larger internal dimension than an outer dimension of the fastener so that the anti-rotation key can move relative to the pin.

10. The system of claim 9, wherein the first tubular member has a second box at an opposite end of the first tubular member from the pin, the second box being releasable secured to a second pin to form a tubular string.

11. The system according to claim 9, further comprising a biasing member located within the recess urging the teeth of the anti-rotation key into engagement with the grooves.

12. The system according to claim 9, wherein each of the teeth of the anti-rotation key has a leading flank and a trailing flank relative to a make-up rotation of the pin and the box, the trailing flank engaging an engaging face of one of the grooves to resist the rotation of the pin relative to the box in the unscrewing direction.

13. The system according to claim 9, wherein the number of grooves is greater than the number of teeth and wherein when the pin lip engages the box lip each of the teeth engages one of the grooves.

* * * * *